US012619619B2

(12) United States Patent (10) Patent No.: US 12,619,619 B2
Jasoriya et al. (45) Date of Patent: May 5, 2026

(54) DETECTING DUPLICATE INCIDENTS USING MACHINE LEARNING TECHNIQUES

(71) Applicant: Dell Products L.P., Round Rock, TX (US)

(72) Inventors: Shreyans Jasoriya, Brighton, MA (US); Anil Kumar Koluguri, Durham, NC (US); David C. Sydow, Merrimack, NH (US); Sebastian Brunet, Miami, FL (US); Soham Joshi, Reston, VA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/478,348

(22) Filed: Sep. 29, 2023

(65) Prior Publication Data

US 2025/0110963 A1 Apr. 3, 2025

(51) Int. Cl.
*G06F 16/2455* (2019.01)
*G06F 11/3604* (2025.01)
*G06F 16/2458* (2019.01)

(52) U.S. Cl.
CPC ...... *G06F 16/2465* (2019.01); *G06F 11/3616* (2013.01); *G06F 16/24556* (2019.01)

(58) Field of Classification Search
CPC .............. G06F 16/1748; G06F 16/215; G06F 16/24556; G06F 16/2465
See application file for complete search history.

(56) References Cited

U.S. PATENT DOCUMENTS 10,089,213 B1 10/2018 Noble et al.
11,379,526 B2 * 7/2022 Srinivas ................. G06N 20/20
(Continued)

FOREIGN PATENT DOCUMENTS

EP 4250133 A 9/2023

OTHER PUBLICATIONS

Devlin, Jacob, et al., "BERT: Pre-training of Deep Bidirectional Transformers for Language Understanding," arXiv preprint arXiv:1810. 04805, Oct. 11, 2018.
(Continued)

*Primary Examiner* — Robert W Beausoliel, Jr.
*Assistant Examiner* — Nirav K Khakhar
(74) *Attorney, Agent, or Firm* — Ryan, Mason & Lewis, LLP

(57) ABSTRACT
Methods, apparatus, and processor-readable storage media for detecting duplicate incidents using machine learning techniques are provided herein. An example method includes obtaining information associated with tracking a first incident in an incident database, generating a summary of the first incident by processing at least a portion of the information using at least one first machine learning model, and generating an embedding of the first incident by processing the generated summary using at least one second machine learning model. The method also includes computing a set of similarity scores for the first incident, determining whether the first incident is a duplicate of at least one of a plurality of additional incidents in the incident database based on the set of similarity scores, and initiating an update to one or more data records in the incident database based at least in part on a result of the determining.

20 Claims, 7 Drawing Sheets

(56) References Cited

U.S. PATENT DOCUMENTS

| | | |
|---|---|---|
| 2011/0066908 A1 | 3/2011 | Bartz et al. |
| 2021/0124876 A1* | 4/2021 | Kryscinski ............ G06F 16/345 |
| 2021/0232387 A1 | 7/2021 | Hicks |
| 2022/0164200 A1 | 5/2022 | Ganhotra |
| 2022/0180247 A1 | 6/2022 | Chow |
| 2023/0419017 A1* | 12/2023 | Fabbri ................... G06F 40/284 |

OTHER PUBLICATIONS

Lewis, Mike, et al., "BART: Denoising Sequence-To-Sequence Pre-training for Natural Language Generation, Translation, and Comprehension," arXiv preprint arXiv:1910.13461, Oct. 29, 2019.

Liu, Yinhan, et al., "ROBERTa: A Robustly Optimized BERT Pretraining Approach," arXiv preprint arXiv:1907.11692, Jul. 26, 2019.

"How to Find Duplicates in Jira?", https://reliex.com/blog/how-to-find-duplicates-in-jira/, Reliex OÜ, available at: https://reliex.com/blog/how-to-find-duplicates-in-jira/ (last accessed Oct. 20, 2022).

Sydow, David C., et al., U.S. Appl. No. 17/970,262, filed Oct. 20, 2022.

Y.-B. Kang et al., "A computer-facilitated method for matching incident cases using semantic similarity measurement," 2009 IFIP/IEEE International Symposium on Integrated Network Management-Workshops, New York, NY, USA, 2009, pp. 10-19, doi: 10.1109/INMW.2009.5.

* cited by examiner

202 — OBTAIN DATA RELATED TO AN INCIDENT

204 — PERFORM NATURAL LANGUAGE PROCESSING OPERATIONS ON THE DATA RELATED TO THE INCIDENT

206 — DENOISE THE DATA RELATED THE INCIDENT

208 — LEMMATIZE THE DATA RELATED TO THE INCIDENT

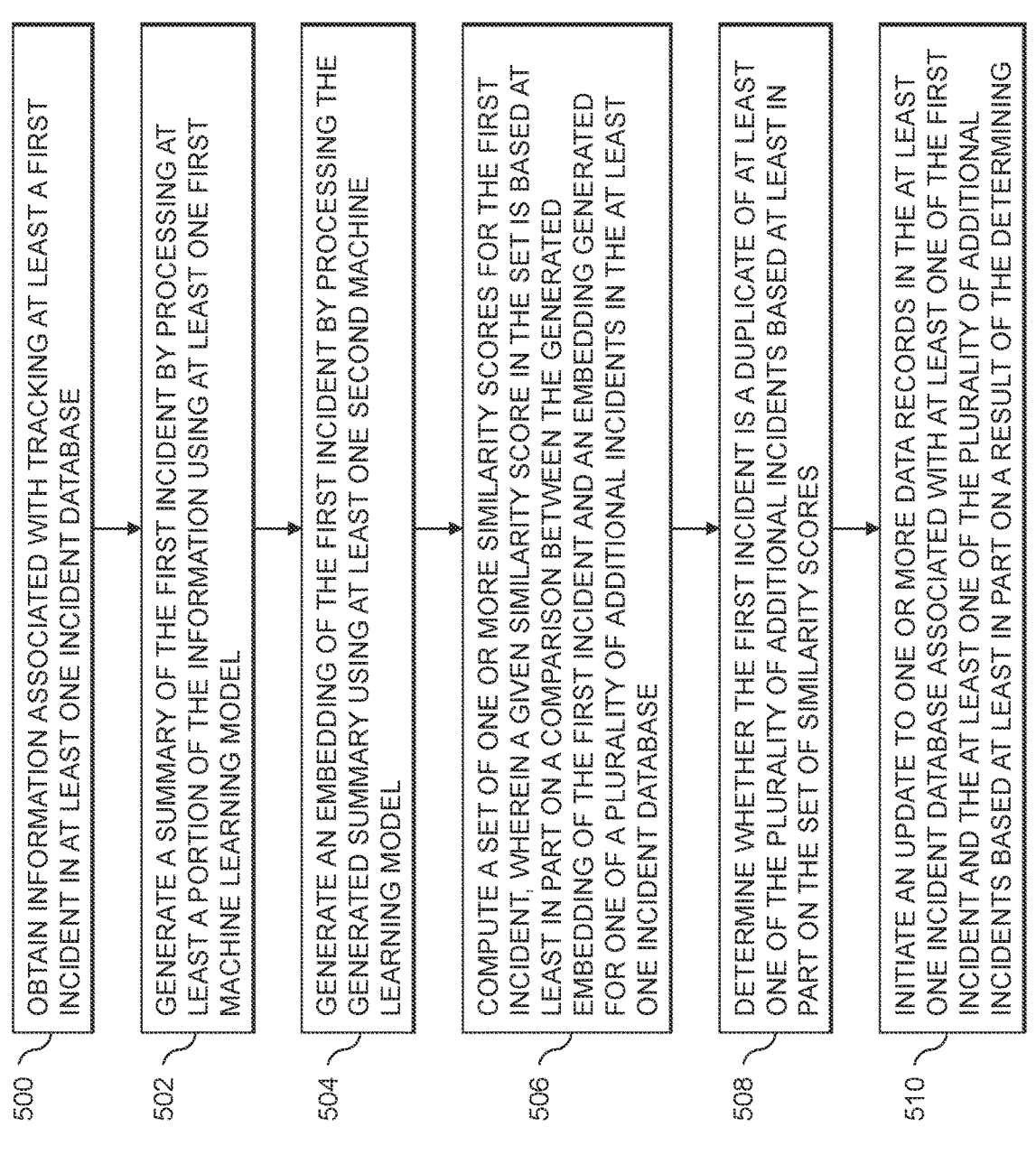

FIG. 5

500 — OBTAIN INFORMATION ASSOCIATED WITH TRACKING AT LEAST A FIRST INCIDENT IN AT LEAST ONE INCIDENT DATABASE

502 — GENERATE A SUMMARY OF THE FIRST INCIDENT BY PROCESSING AT LEAST A PORTION OF THE INFORMATION USING AT LEAST ONE FIRST MACHINE LEARNING MODEL

504 — GENERATE AN EMBEDDING OF THE FIRST INCIDENT BY PROCESSING THE GENERATED SUMMARY USING AT LEAST ONE SECOND MACHINE LEARNING MODEL

506 — COMPUTE A SET OF ONE OR MORE SIMILARITY SCORES FOR THE FIRST INCIDENT, WHEREIN A GIVEN SIMILARITY SCORE IN THE SET IS BASED AT LEAST IN PART ON A COMPARISON BETWEEN THE GENERATED EMBEDDING OF THE FIRST INCIDENT AND AN EMBEDDING GENERATED FOR ONE OF A PLURALITY OF ADDITIONAL INCIDENTS IN THE AT LEAST ONE INCIDENT DATABASE

508 — DETERMINE WHETHER THE FIRST INCIDENT IS A DUPLICATE OF AT LEAST ONE OF THE PLURALITY OF ADDITIONAL INCIDENTS BASED AT LEAST IN PART ON THE SET OF SIMILARITY SCORES

510 — INITIATE AN UPDATE TO ONE OR MORE DATA RECORDS IN THE AT LEAST ONE INCIDENT DATABASE ASSOCIATED WITH AT LEAST ONE OF THE FIRST INCIDENT AND THE AT LEAST ONE OF THE PLURALITY OF ADDITIONAL INCIDENTS BASED AT LEAST IN PART ON A RESULT OF THE DETERMINING

DETECTING DUPLICATE INCIDENTS USING MACHINE LEARNING TECHNIQUES

BACKGROUND

Issue tracking systems generally refer to systems that can manage and maintain information related to issues or other incidents. For example, such systems are often used to track software errors and/or flaws in software development projects.

SUMMARY

Illustrative embodiments of the disclosure provide techniques for detecting duplicate incidents using machine learning techniques. An exemplary computer-implemented method includes obtaining information associated with tracking at least a first incident in at least one incident database and generating a summary of the first incident by processing at least a portion of the information using at least one first machine learning model. The method additionally includes generating an embedding of the first incident by processing the generated summary using at least one second machine learning model and computing a set of one or more similarity scores for the first incident, where a given similarity score in the set is based at least in part on a comparison between the generated embedding of the first incident and an embedding generated for one of a plurality of additional incidents in the at least one incident database. The method also includes determining whether the first incident is a duplicate of at least one of the plurality of additional incidents based at least in part on the set of similarity scores and initiating an update to one or more data records in the at least one incident database associated with at least one of the first incident and the at least one of the plurality of additional incidents based at least in part on a result of the determining.

Illustrative embodiments can provide significant advantages relative to conventional incident detection techniques. For example, technical problems associated with detecting duplicate incidents are mitigated in one or more embodiments by automatically identifying duplicate incidents in an incident database by generating summaries and embeddings for such incidents at respective stages of a machine learning framework and then comparing such embeddings to identify duplicate embeddings. Such embodiments can help reduce the amount of time and resources that are needed to detect and/or prevent duplicate incidents, for example.

These and other illustrative embodiments described herein include, without limitation, methods, apparatus, systems, and computer program products comprising processor-readable storage media.

BRIEF DESCRIPTION OF THE DRAWINGS

FIG. 5 shows a flow diagram of a process for detecting duplicate incidents using machine learning techniques in an illustrative embodiment.

DETAILED DESCRIPTION

Figure 1:
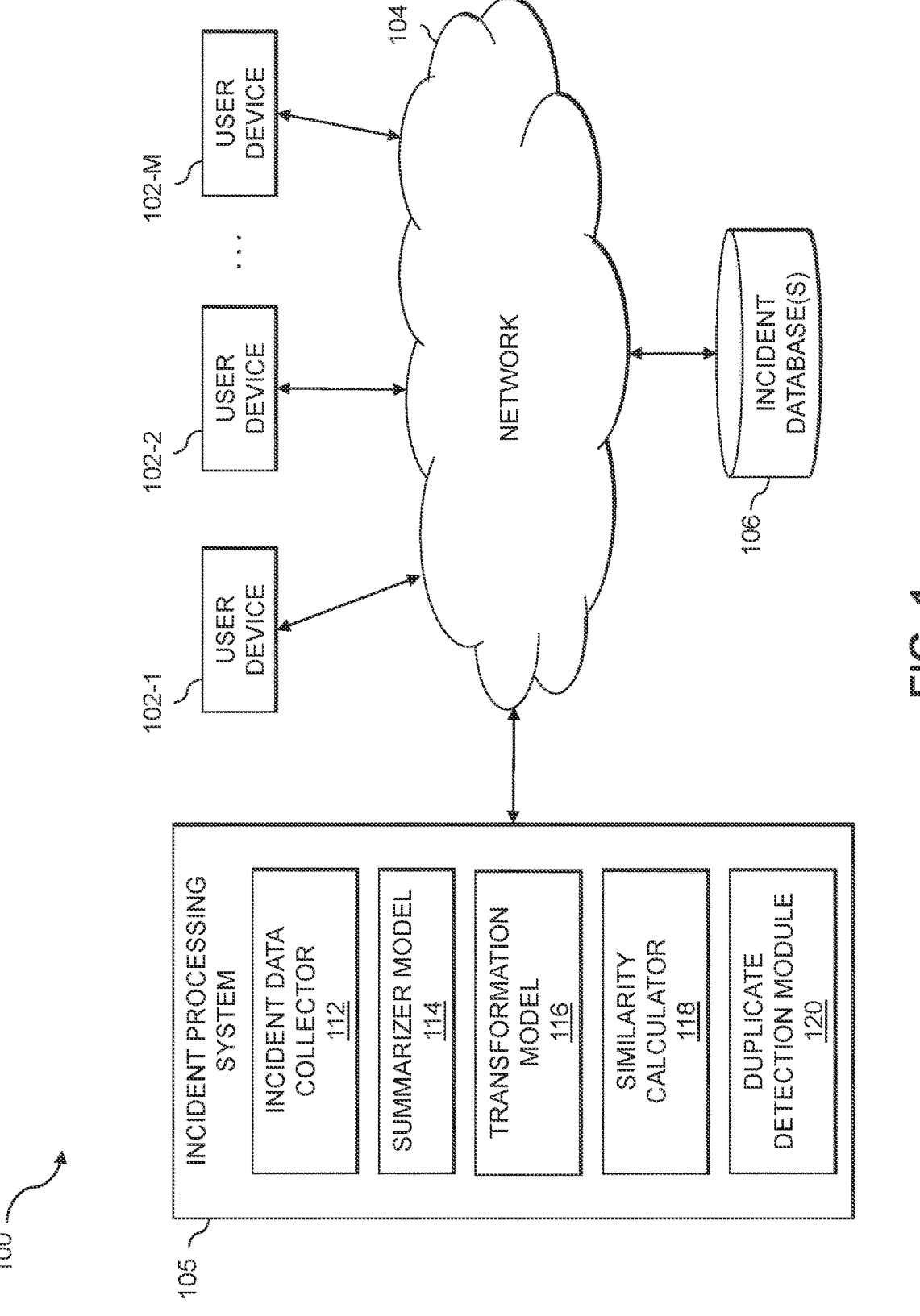
FIG. 1 shows an information processing system configured for detecting duplicate incidents using machine learning techniques in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Effectively tracking incidents for complex projects (e.g., software projects) can be technically challenging. As an example, for a given software project, many developers can submit code to one or more code databases. During the development process, the submitted code can include errors, which can be tracked using incident or ticket tracking systems, for example. A significant portion of the tracked incidents are duplicate incidents. In this context and elsewhere herein, the term "duplicates" is intended to be broadly construed so as to encompass two or more data structures that are created for a same or a substantially similar issue or other incident. Such data structures can comprise information identifying and/or describing an issue or other incident (e.g., title, one or more descriptions, comments, and/or other information related to tracking such incidents).

Identifying and managing duplicate incidents can be time consuming and inefficient. For example, if two or more tickets are created for a single software error, then multiple developers may be assigned to triage (e.g., evaluate) the same software error. Additional computing resources are also needed to create, store, and manage such tickets. Conventional approaches for detecting duplicate tickets generally include applying one or more static sets of rules to incident logs. Such rules are difficult to create and manage, and often do not consider input that is provided from end-users (e.g., comments about such incidents).

In some approaches, vector embeddings of data structures corresponding to incidents can be generated based on a Term Frequency-Inverse Document Frequency (TF-IDF) process. A TF-IDF refers to a numeric statistic derived from a text corpus and reflects an importance of a word with respect to the corpus. TF-IDF generally does not indicate the context of words and semantic meanings since factors such as word order, compound nouns, and negation are often not considered. Also, the size of TF-IDF vectors is equal to the size of the vocabulary, and therefore TF-IDF approaches can suffer from what is commonly referred to as the curse of dimensionality. The curse of dimensionality describes that increasing data dimensions often result in an exponential increase in computational resources for analyzing and/or processing such data.

One or more embodiments described herein describe a hybrid deep learning approach that generates a summary of textual data corresponding to a given incident tracked in a database (e.g., an incident database) and generates semantic and contextual embeddings that are used to determine a similarity between the given incident and other incidents.

Such embodiments can help reduce the amount of time and resources that are needed to detect and/or prevent duplicate incidents, for example.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is an incident processing system 105.

The user devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the incident processing system 105 can have at least one associated incident database 106 configured to store data pertaining to, for example, one or more incidents.

An example incident database 106, such as depicted in the present embodiment, can be implemented using one or more storage systems associated with the incident processing system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the incident processing system 105 are one or more input-output devices, which illustratively comprise keyboards, displays or other types of input-output devices in any combination. Such input-output devices can be used, for example, to support one or more user interfaces to the incident processing system 105, as well as to support communication between the incident processing system 105 and other related systems and devices not explicitly shown.

Additionally, the incident processing system 105 in the FIG. 1 embodiment is assumed to be implemented using at least one processing device. Each such processing device generally comprises at least one processor and an associated memory, and implements one or more functional modules for controlling certain features of the incident processing system 105.

More particularly, the incident processing system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the incident processing system 105 to communicate over the network 104 with the user devices 102, and illustratively comprises one or more conventional transceivers.

The incident processing system 105 further comprises an incident data collector 112, a summarizer model 114, a transformation model 116, a similarity calculator 118, and a duplicate detection module 120.

The incident data collector 112 includes functionality for collecting relevant incident data (e.g., from the incident database 106) and preprocessing the collected incident data. A non-limiting example of techniques for preprocessing the collected incident data is described in more detail in conjunction with FIG. 2.

The summarizer model 114 generates a summary of the preprocessed incident data output by the incident data collector 112. As a non-limiting example, the summarizer model 114 may comprise a transformer-based model. An example of a transformer-based model includes a bidirectional encoder (e.g., a bidirectional encoder representations from transformers (BERT) model). A BERT model generally uses an attention mechanism that learns contextual relations between words and/or sub-words in text. As an example, the BERT model can include an embedding layer that converts each input (e.g., a word or token) from an input sequence into a corresponding vector representation. An encoding layer having a plurality of self-attention layers can process different parts of the input sequence to learn long range dependencies between the inputs. In some examples, an output layer can project hidden representations from the encoding layer to the desired output format. BERT models are discussed in more detail in Devlin, Jacob, et al., "BERT: Pre-training of Deep Bidirectional Transformers for Language Understanding," arXiv preprint arXiv:1810.04805, Oct. 11, 2018, which is hereby incorporated by reference in its entirety.

According to at least one embodiment, the summarizer model 114 can comprise a bidirectional auto-regressive transformer (BART) model. A BART model can generally be implemented as a sequence-to-sequence model having a bidirectional encoder (e.g., BERT) and an autoregressive decoder (e.g., a generative pre-trained transformers (GPT) model). As noted above, the BERT model can be trained to learn contextual relations of a sequence of input. The autoregressive decoder of the BART model learns to generate an output sequence (e.g., one token at a time), conditioned on the hidden representations output by the bidirectional encoder. It is noted that the BART model, in contrast to a BERT model, performs cross-attention over the final hidden layer of the encoder. Additional information about BART models can be found in Lewis, Mike, et al., "BART: Denoising Sequence-To-Sequence Pre-training for Natural Language Generation, Translation, and Comprehension," arXiv preprint arXiv:1910.13461, Oct. 29, 2019, which is hereby incorporated by reference in its entirety.

The BART model, in at least some embodiments, can be pretrained using a generic set of data (e.g., a set of data comprising human-generated summaries of online news stories). The BART model can be pretrained to process corrupted portions of the set of data (e.g., data corrupted using a random noise function) to identify the original (uncorrupted) data. In some embodiments, the pretrained BART model is then fine-tuned using a set of training data associated with historical incidents, as explained in more detail elsewhere herein.

In some embodiments, the transformation model 116 generates embeddings (e.g., vector embeddings) for summaries output by the summarizer model 114. As a non-limiting example, the transformation model 116 may include a transformer-based model, such as a BERT model or a robustly optimized BERT approach (RoBERTa) model. The architecture of a RoBERTa model can be similar to the architecture of a BERT model. A RoBERTa model generally is implemented as a modified version of a BERT model that is trained on a larger dataset and for a longer period of time. Also, the RoBERTa model uses a byte-level byte pair encoding (BPE) tokenizer as opposed to a word-level tokenizer used by a BERT model. RoBERTa models are discussed in more detail in Liu, Yinhan, et al., "RoBERTa: A Robustly Optimized BERT Pretraining Approach," arXiv preprint arXiv:1907.11692, Jul. 26, 2019, which is hereby incorporated by reference in its entirety.

In at least one embodiment, the transformation model 116 can be pretrained on a dataset in at least one language (e.g., a dataset in English), and then fine-tuned based on historical incidents. The transformation model 116 can generate improved embeddings as a result of this fine-tuning as the transformation model 116 considers technical terms and/or technologies that may be specific to the incidents in the incident database 106.

The similarity calculator 118, in some embodiments, computes similarity scores between pairs of embeddings generated by the transformation model 116. As an example, when an incident is entered and/or updated in the incident database 106, the similarity calculator 118 can compute cosine similarity scores between the embedding of the incident and other incidents associated with the incident database 106. The duplicate detection module 120 evaluates whether or not the incident is a duplicate of at least one prior tracked incident based at least in part on the similarity scores.

In one or more embodiments, the at least one incident database 106 can be managed using one or more incident tracking platforms (not explicitly shown in FIG. 1). In such embodiments, the incident processing system 105 can use one or more application programming interfaces (APIs) to read from, and write to, the incident database 106. For example, the incident processing system 105 can send notifications of duplicate incidents maintained in the incident database 106 and/or perform one or more actions related to incidents managed by such platforms, as explained in more detail elsewhere herein.

It is to be appreciated that this particular arrangement of elements 112, 114, 116, 118, and 120 illustrated in the incident processing system 105 of the FIG. 1 embodiment is presented by way of example only, and alternative arrangements can be used in other embodiments. For example, the functionality associated with the elements 112, 114, 116, 118, and 120 in other embodiments can be combined into a single module, or separated across a larger number of modules. As another example, multiple distinct processors can be used to implement different ones of the elements 112, 114, 116, 118, and 120 or portions thereof.

At least portions of elements 112, 114, 116, 118, and 120 may be implemented at least in part in the form of software that is stored in memory and executed by a processor.

It is to be understood that the particular set of elements shown in FIG. 1 for incident processing system 105 involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the incident processing system 105 and the incident database(s) 106 can be on and/or part of the same processing platform. Additionally, it is to be appreciated that at least a portion of the incident processing system 105 and/or incident database 106 can be implemented on one or more of the user devices 102.

An exemplary process utilizing elements 112, 114, 116, 118, and 120 of an example incident processing system 105 in computer network 100 will be described in more detail with reference to, for example, the flow diagram of FIG. 5.

Figure 2:
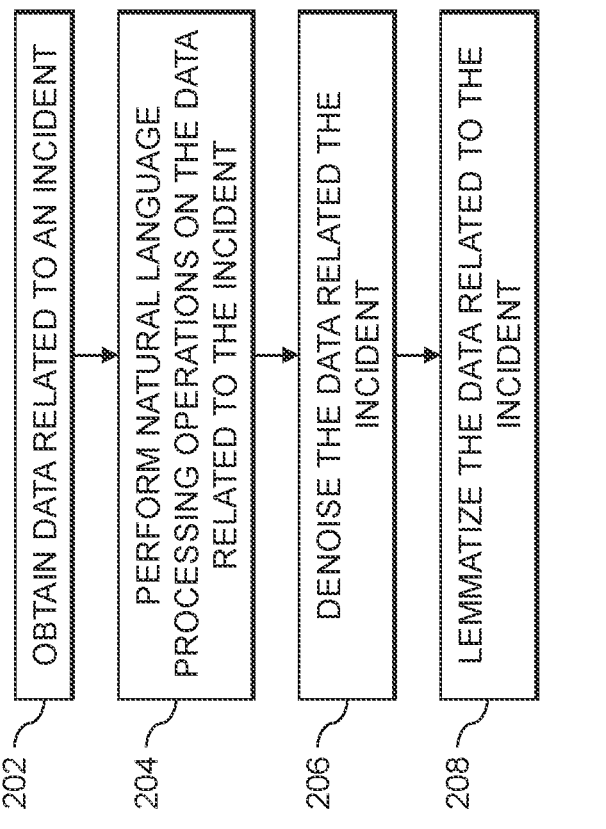
FIG. 2 shows an example of a process for collecting and preprocessing incident data in an illustrative embodiment.

FIG. 2 shows an example of a process for collecting and preprocessing incident data in an illustrative embodiment. It is to be understood that this particular process is only an example, and additional or alternative processes can be carried out in other embodiments. In some embodiments, the process can be implemented at least in part by the incident data collector 112 of an incident processing system 105.

Step 202 includes obtaining data related to an incident, for example, an incident associated with the incident database 106. In some embodiments, at least a portion of the data can be obtained via one or more APIs associated with an incident or ticket tracking system. The obtained data may include, for example, textual information related to one or more characteristics of the incident. In at least one embodiment, the textual information can include a title corresponding to the incident, a description related to the incident, one or more comments related to the incident, one or more log messages related to the incident, one or more errors related to the incident, and/or one or more code snippets related to the incident. The textual information may additionally or alternatively include one or more timestamps, one or more internet protocol (IP) addresses related to the incident, identifiers of one or more systems related to the incident, one or more process identifiers, and/or other types of variables related to the incident.

Step 204 includes performing one or more natural language processing (NLP) operations on the obtained data, which can convert the obtained data into a particular format, for example. For example, the NLP operations may include removing stop words, removing punctuation, converting at least a portion of the text to lower case, and/or other operations for converting the obtained data into the particular format.

Step 206 includes denoising the data related to the incident. By way of example, some of the text in the data may be less relevant than other portions of the text, such as certain variables (e.g., timestamps, IP addresses, system names, and/or process identifiers) in log messages, errors, and/or code snippets. Step 206 can remove such variables from the data output by step 204. In some embodiments, generic placeholders can replace the values of such variables.

Step 208 includes lemmatizing the data related to the incident. The lemmatizing in step 208 generally includes a process for grouping different forms of a given word so that they are analyzed and/or processed as a same item. For example, step 208 can include mapping different forms of a given word to a same root word.

Consider an example where the obtained data at step 202 includes the following text: CLONE—[sysQA] [system-_ABC] remove 3 drives (current amount is 15 disks need to be 12). The text output at step 204 is then: clone sysqa systemABC remove 3 drives current amount 15 disks need 12. Step 206, in some embodiments, replaces the system name and the number values with generic placeholders, which results in the following text: clone sysqa <:SYS-_NAME:> remove <:NUM:> drives current amount <:NUM:> disks need <:NUM:>. The text is lemmatized at step 208, thereby resulting in the following: clone sysqa <:SYS_NAME:> remove <:NUM:> drive current amount <:NUM:> disk need <:NUM:>.

According to at least one embodiment, one or more designated portions of the data (e.g., data corresponding to a title, description, and/or user comments) obtained at step 202 can be combined into a single string. In one such embodiment, the string can be tokenized, e.g., using a tokenizer (e.g., a tokenizer corresponding to the summarizer model 114). In at least some embodiments, the tokenizer can include a byte-level BPE tokenizer. Optionally, resulting tokens are truncated to a designated number of characters (e.g., 1024), if needed.

Figure 3:
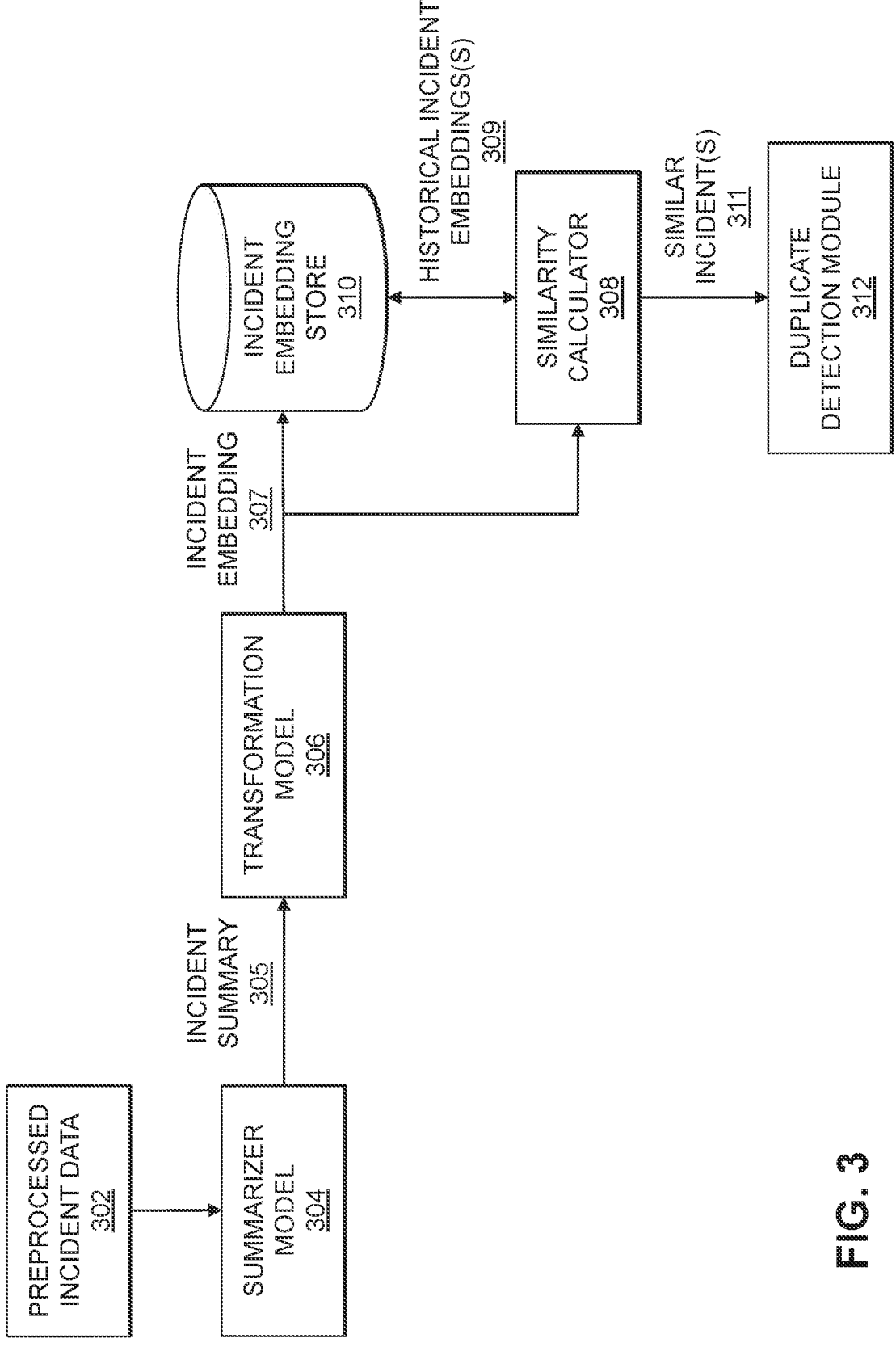
FIG. 3 shows an example of a machine learning pipeline for detecting duplicate incidents in an illustrative embodiment.

FIG. 3 shows an example of a machine learning pipeline for detecting duplicate incidents in an illustrative embodiment. In the FIG. 3 example, preprocessed incident data 302 is provided as input to a summarizer model 304 (e.g., corresponding to summarizer model 114). For example, the preprocessed incident data 302 can correspond to incident data that has been preprocessed using the process shown in FIG. 2. The summarizer model 304 generates and outputs an incident summary 305 corresponding to the preprocessed incident data 302. The incident summary 305 is then provided as input to a transformation model 306 (e.g., corresponding to transformation model 116), which generates an incident embedding 307 based on the incident summary 305.

For example, the transformation model 306, in some embodiments, is configured to map variable-length text corresponding to the incident summary 305 to the incident embedding 307, where the incident embedding 307 is of a fixed size.

The incident embedding 307 is stored in an incident embedding store 310, which in some embodiments can be implemented using the one or more incident databases 106, for example. The incident embedding 307 is also provided to a similarity calculator 308. The similarity calculator 308 obtains one or more historical incident embeddings 309 from the incident embedding store 310 and calculates pairwise similarity scores indicating a level of similarity between the incident embedding 307 and respective ones of the historical incident embeddings 309. The similarity calculator 308, in some embodiments, can output information indicating one or more similar incidents 311 to the duplicate detection module 312 based on the similarity scores. For example, the similarity calculator 308 can perform a semantic textual similarity analysis of the incident embedding 307 and the historical incident embeddings 309 at least in part by computing cosine similarities between them.

For example, a given one of the similar incidents 311 may be identified based on whether the pairwise similarity score computed for the incident embedding 307 and the historical incident embedding 309 corresponding to the given one of the similar incidents 311 satisfies a threshold value. Alternatively or additionally, a designated number of similar incidents 311 can be output to the duplicate detection module 312 having historical incident embeddings 309 that are most similar to the incident embedding 307.

According to some embodiments, it is assumed that the summarizer model 304 can be implemented using a BART model that has been pretrained in one or more languages and fine-tuned over a generic dataset. The summarizer model 304 is then fine-tuned using a training dataset associated with the incident database 106 and/or the incident embedding store 310. As a non-limiting example, the training dataset may include triplet data structures of text corresponding to incidents. For example, the first value in the triplet can correspond to text associated with a first incident, the second value can correspond to text associated with a second incident that is known to be a duplicate of the first incident, and the third value can correspond to an incident that is not a duplicate of the first or second incidents.

The transformation model 306 can be implemented as a RoBERTa model that is pretrained on a particular dataset (e.g., a dataset specific to RoBERTa), and is fine-tuned using the training dataset of triplet data structures corresponding to the incidents. This improves the embeddings generated by the transformation model 306 as they retain contextual information based on the particular characteristics associated with the incident database 106, for example. In some embodiments, it is assumed that the summarizer model 304 and the transformation model 306 are pretrained using different datasets. However, it is to be appreciated that in other embodiments the models 304 and 306 can be pretrained on at least a portion of the same dataset or datasets that at least partially overlap.

Inferencing of new and/or updated incidents can be performed in substantially real time using the machine learning pipeline described in FIG. 3. For example, when an incident is created and/or updated, the incident text can be processed by the machine learning pipeline shown in FIG. 3 to generate an embedding, which can be compared to the historical incident embeddings 309 in the incident embedding store 310.

Figure 4:
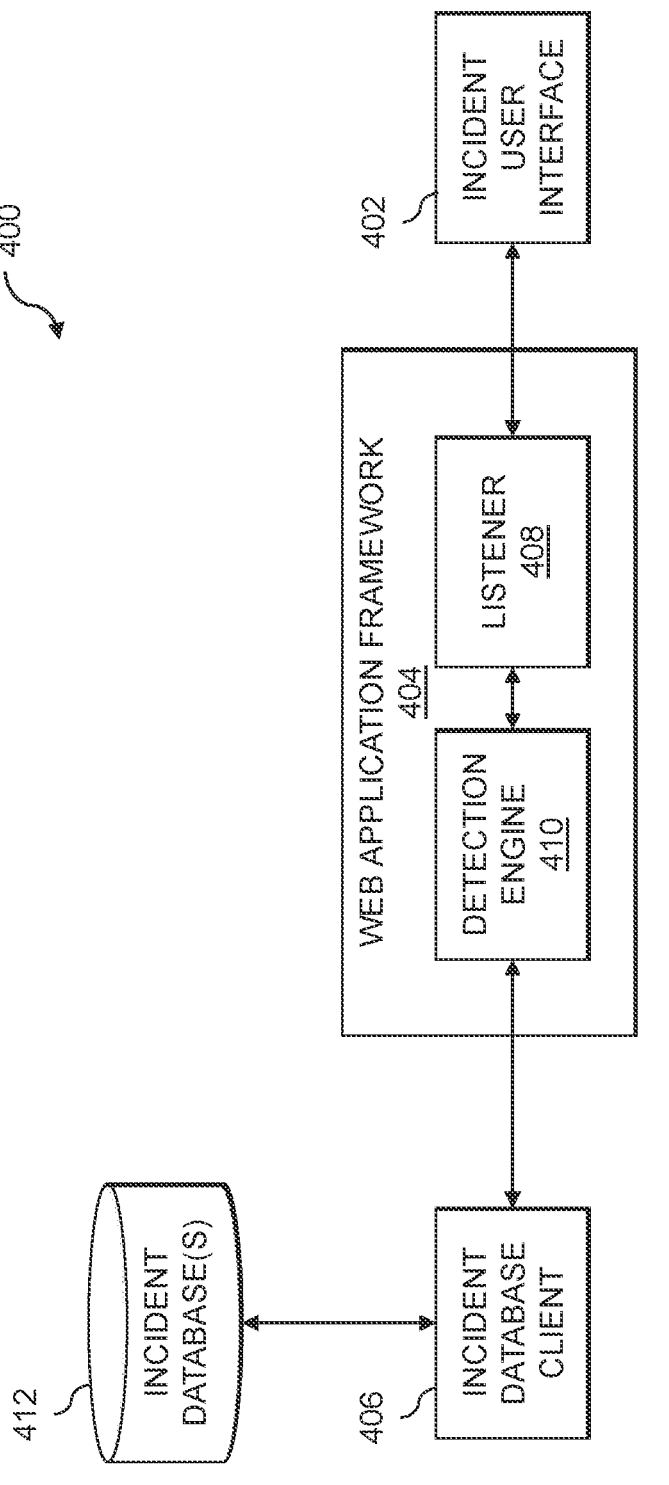
FIG. 4 shows an example of an integration framework in an illustrative embodiment.

FIG. 4 shows an example of an integration framework 400 in an illustrative embodiment. The integration framework 400 includes an incident user interface 402. The incident user interface 402 can include functionality for a user to create one or more incidents, and enter information related to such incidents, as described in more detail elsewhere herein. The integration framework 400 also includes a web application framework 404, an incident database client 406, and at least one incident database 412.

In this example, the web application framework 404 includes a listener 408 and a detection engine 410. The listener 408 detects different types of requests initiated by the incident user interface 402. As an example, the incident user interface 402 can include a first webhook that can enable the listener 408 to detect requests for creating new incidents in the incident database 412, and a second webhook can enable the listener 408 to detect requests for updating one or more incidents in the incident database 412.

In response to the listener 408 detecting a request for creating a new incident, the listener 408 can mark the new incident as a candidate training sample, which can be used to train one or more of the summarizer model 114 and the transformation model 116, as described in more detail elsewhere herein.

Additionally, the detection engine 410 obtains information related to incidents stored in the at least one incident database 412 via the incident database client 406, and determines whether the new incident is a duplicate of an incident that is stored in the at least one incident database 412 (e.g., as described in conjunction with FIG. 3).

In response to the listener 408 detecting a request to update a new incident, the detection engine 410 checks whether the updated incident is a duplicate of an incident that is stored in the at least one incident database 412. It is noted that a request to create a new incident may include a limited amount of information about the incident, which can make it difficult to detect any duplicates. Thus, the detection engine 410 can improve over time as it analyzes incidents in the at least one incident database 412 as they are updated with new comments and/or other new information, for example.

Additionally, if the detection engine 410 detects that a duplicate incident is found from a new or updated incident request, it can tag or post a comment using one or more APIs associated with incident database client 406, for example. As an example, a comment can be added to the new or updated incident, which includes at least one of: one or more detected duplicate incidents, one or more links to the detected duplicate incidents, and respective confidence levels of the detected duplicate incidents. In at least some embodiments, similar information can also be added to the detected incidents.

FIG. 5 is a flow diagram of a process for detecting duplicate incidents using machine learning techniques in an illustrative embodiment. It is to be understood that this particular process is only an example, and additional or alternative processes can be carried out in other embodiments.

In this embodiment, the process includes steps 500 through 510. These steps are assumed to be performed by the incident processing system 105 utilizing its elements 112, 114, 116, 118, and 120.

Step 500 includes obtaining information associated with tracking at least a first incident in at least one incident database. Step 502 includes generating a summary of the first incident by processing at least a portion of the information using at least one first machine learning model. Step

504 includes generating an embedding of the first incident by processing the generated summary using at least one second machine learning model. Step 506 includes computing a set of one or more similarity scores for the first incident, wherein a given similarity score in the set is based at least in part on a comparison between the generated embedding of the first incident and an embedding generated for one of a plurality of additional incidents in the at least one incident database. Step 508 includes determining whether the first incident is a duplicate of at least one of the plurality of additional incidents based at least in part on the set of similarity scores. Step 510 includes initiating an update to one or more data records in the at least one incident database associated with at least one of the first incident and the at least one of the plurality of additional incidents based at least in part on a result of the determining.

The at least one first machine learning model may include a bidirectional auto-regressive transformer model.

The at least one second machine learning model may include a robustly optimized bidirectional encoder representations from transformers approach model.

At least one of the at least one first machine learning model and the at least one second machine learning model may be pretrained on at least one generic textual dataset and may be further trained using a dataset that is specific to the at least one incident database. For example, the at least one generic textual dataset may be associated with one or more particular languages and/or comprise data related to one or more online sources. As non-limiting examples, the data can be associated with news articles and/or online encyclopedias.

The dataset that is specific to the at least one incident database may include a plurality of items. Each item can include a first portion having text associated with a first historical incident of the at least one incident database, a second portion having text associated with a second historical incident that is a duplicate of the first historical incident, and a third portion having text associated with a third historical incident that is not a duplicate of the first incident. The first incident may relate to a software defect in one or more software code repositories. The information associated with tracking the first incident may include a title of the first incident, one or more user comments related to the software defect, a location of the software defect within software code associated with the one or more software code repositories, one or more log messages related to the software defect, and/or one or more errors related to the software defect.

The process in FIG. 5 may further include a step of preprocessing the information. The preprocessing may include identifying at least one type of variable in the information and replacing one or more values corresponding to the at least one type of variable with a designated value. Computing the similarity score between the first incident and a given additional incident of the plurality of additional incidents may include computing a cosine similarity of the embedding corresponding to the first incident and the embedding corresponding to the given additional incident.

The initiating the update in step 510 may include assigning a flag to at least one of the first incident and the at least one of the plurality of additional incidents in the at least one incident database, adding one or more comments related to at least one of the first incident and the at least one of the plurality of additional incidents in the at least one incident database, and/or performing a merge operation to combine the first incident and the at least one of the plurality of additional incidents in the at least one incident database.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve incident processing techniques. These and other embodiments can effectively overcome problems associated with existing techniques that generally rely on static rules and/or require significant computational resources to detect such duplicates. For example, some embodiments are configured to implement a multi-stage machine learning pipeline that generates a summary of textual data corresponding to a given incident in an incident database at a first stage of a machine learning pipeline and generates an embedding based on the summary of textual data at a second stage of the machine learning pipeline, which is used to determine whether the first incident is a duplicate based on comparison of the embedding to embeddings of other incidents in the incident database. Such embodiments can help reduce the amount of time and resources that are needed to detect and/or prevent duplicate incidents, for example.

It is to be appreciated that the particular advantages described above and elsewhere herein are associated with particular illustrative embodiments and need not be present in other embodiments. Also, the particular types of information processing system features and functionalities as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
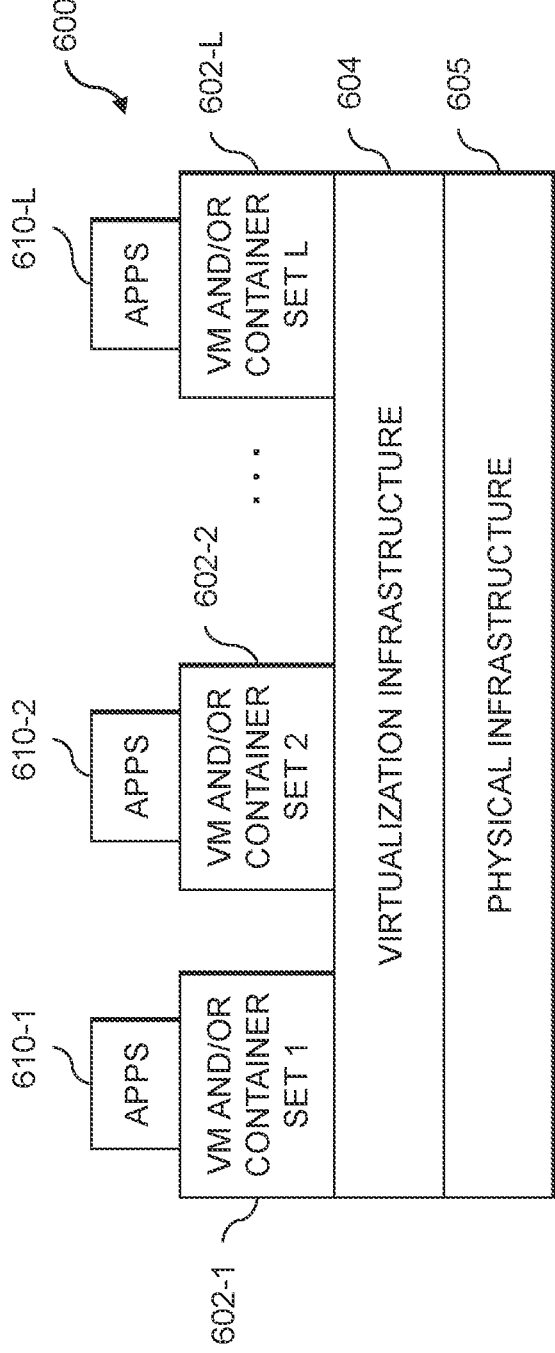
FIGS. 6 and 7 show examples of processing platforms that may be utilized to implement at least a portion of an information processing system in illustrative embodiments.
Figure 7:
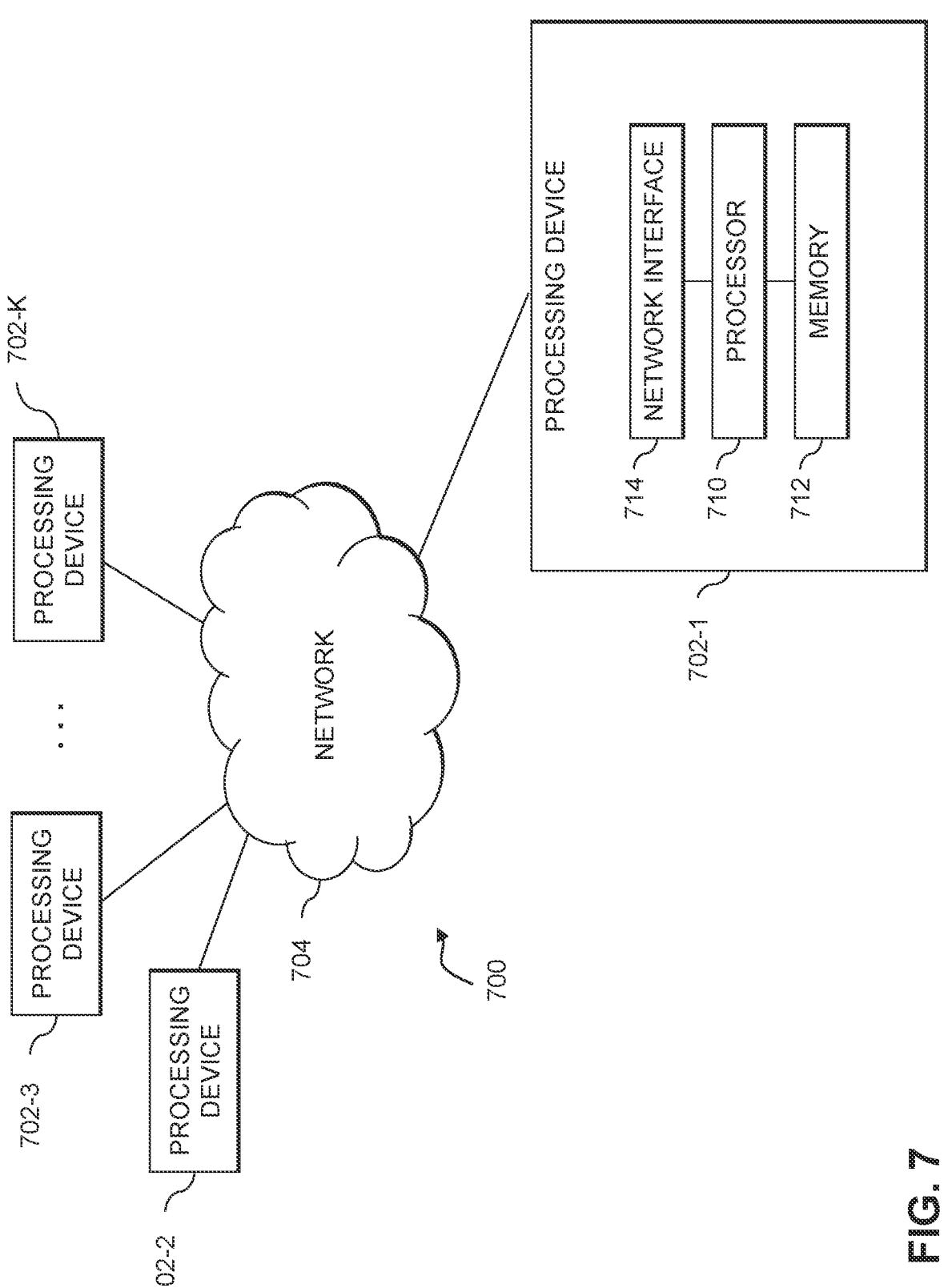

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, wherein the hypervisor platform has an associated virtual infrastructure management system. The underlying physical machines comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a micro-controller, an ASIC, an FPGA or other type of processing circuitry, as well as portions or combinations of such circuitry elements.

The memory 712 comprises RAM, ROM or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:

obtaining information associated with tracking at least a first incident in at least one incident database;

processing at least a portion of the information by at least one first machine learning model, comprising a transformer-based machine learning model, in a first stage of a multi-stage machine learning pipeline, wherein the at least one first machine learning model generates a summary of the first incident comprising semantic and contextual information, wherein the at least one first machine learning model comprises an attention mechanism that learns contextual relations between parts of the at least the portion of the information;

processing the generated summary by at least one second machine learning model in a second stage of the multi-stage machine learning pipeline, wherein the at least one second machine learning model generates a fixed-size embedding encoding the semantic and contextual information from the generated summary of the first incident;

computing a set of one or more similarity scores for the first incident, wherein a given similarity score in the set is based at least in part on a comparison between the generated fixed-size embedding of the first incident and a fixed-size embedding generated by the at least one second machine learning model for one of a plurality of additional incidents in the at least one incident database;

determining whether the first incident is a duplicate of at least one of the plurality of additional incidents based at least in part on the set of similarity scores; and initiating an update to one or more data records in the at least one incident database associated with at least one of the first incident and the at least one of the plurality of additional incidents based at least in part on a result of the determining;

wherein the method is performed by at least one processing device comprising a processor coupled to a memory.

2. The computer-implemented method of claim 1, wherein the at least one first machine learning model comprises a bidirectional auto-regressive transformer model.

3. The computer-implemented method of claim 1, wherein the at least one second machine learning model comprises a robustly optimized bidirectional encoder representations from transformers approach model.

4. The computer-implemented method of claim 1, wherein at least one of: the at least one first machine learning model and the at least one second machine learning model is pretrained on at least one generic textual dataset and is further trained using a dataset that is specific to the at least one incident database.

5. The computer-implemented method of claim 4, wherein the dataset that is specific to the at least one incident database comprises a plurality of items, wherein each item comprises:

a first portion comprising text associated with a first historical incident of the at least one incident database;

a second portion comprising text associated with a second historical incident of the at least one incident database, wherein the second historical incident is a duplicate of the first historical incident; and a third portion comprising text associated with a third historical incident of the at least one incident database that is not a duplicate of the first historical incident.

6. The computer-implemented method of claim 1, wherein the first incident relates to a software defect in one or more software code repositories.

7. The computer-implemented method of claim 6, wherein the information associated with tracking the first incident comprises at least one of:

a title of the first incident;

one or more user comments related to the software defect;

a location of the software defect within software code associated with the one or more software code repositories;

one or more log messages related to the software defect; and one or more errors related to the software defect.

8. The computer-implemented method of claim 1, further comprising:

performing a denoising operation that identifies one or more variables corresponding to at least one of: (i) a timestamp, (ii) an internet protocol address, (iii) a system name, and (iv) a process identifier in the information; and replacing one or more values corresponding to the one or more variables with a designated placeholder value.

9. The computer-implemented method of claim 1, wherein computing the similarity score between the first incident and a given additional incident of the plurality of additional incidents comprises:

computing a cosine similarity of the embedding corresponding to the first incident and the embedding corresponding to the given additional incident.

10. The computer-implemented method of claim 1, wherein the initiating the update comprises at least one of:

assigning a flag to at least one of the first incident and the at least one of the plurality of additional incidents in the at least one incident database;

adding one or more comments related to at least one of the first incident and the at least one of the plurality of additional incidents in the at least one incident database; and performing a merge operation to combine the first incident and the at least one of the plurality of additional incidents in the at least one incident database.

11. A non-transitory processor-readable storage medium having stored therein program code of one or more software programs, wherein the program code when executed by at least one processing device causes the at least one processing device:

to obtain information associated with tracking at least a first incident in at least one incident database;

to process at least a portion of the information by at least one first machine learning model, comprising a transformer-based machine learning model, in a first stage of a multi-stage machine learning pipeline, wherein the at least one first machine learning model generates a summary of the first incident comprising semantic and contextual information, wherein the at least one first machine learning model comprises an attention mechanism that learns contextual relations between parts of the at least the portion of the information;

to process the generated summary by at least one second machine learning model in a second stage of the multi-stage machine learning pipeline, wherein the at least one second machine learning model generates a fixed-size embedding encoding the semantic and contextual information from the generated summary of the first incident;

to compute a set of one or more similarity scores for the first incident, wherein a given similarity score in the set is based at least in part on a comparison between the generated fixed-size embedding of the first incident and a fixed-size embedding generated by the at least one second machine learning model for one of a plurality of additional incidents in the at least one incident database;

to determine whether the first incident is a duplicate of at least one of the plurality of additional incidents based at least in part on the set of similarity scores; and to initiate an update to one or more data records in the at least one incident database associated with at least one of the first incident and the at least one of the plurality of additional incidents based at least in part on a result of the determining.

12. The non-transitory processor-readable storage medium of claim 11, wherein the at least one first machine learning model comprises a bidirectional auto-regressive transformer model.

13. The non-transitory processor-readable storage medium of claim 11, wherein the at least one second machine learning model comprises a robustly optimized bidirectional encoder representations from transformers approach model.

14. The non-transitory processor-readable storage medium of claim 11, wherein at least one of: the at least one first machine learning model and the at least one second machine learning model is pretrained on at least one generic textual dataset and is further trained using a dataset that is specific to the at least one incident database.

15. The non-transitory processor-readable storage medium of claim 14, wherein the dataset that is specific to the at least one incident database comprises a plurality of items, wherein each item comprises:

a first portion comprising text associated with a first historical incident of the at least one incident database;

a second portion comprising text associated with a second historical incident of the at least one incident database, wherein the second historical incident is a duplicate of the first historical incident; and a third portion comprising text associated with a third historical incident of the at least one incident database that is not a duplicate of the first historical incident.

16. An apparatus comprising:

at least one processing device comprising a processor coupled to a memory;

the at least one processing device being configured:

to obtain information associated with tracking at least a first incident in at least one incident database;

to process at least a portion of the information by at least one first machine learning model, comprising a trans-former-based machine learning model, in a first stage of a multi-stage machine learning pipeline, wherein the at least one first machine learning model generates a summary of the first incident comprising semantic and contextual information, wherein the at least one first machine learning model comprises an attention mecha-nism that learns contextual relations between parts of the at least the portion of the information;

to process the generated summary by at least one second machine learning model in a second stage of the multi-stage machine learning pipeline, wherein the at least one second machine learning model generates a fixed-size embedding encoding the semantic and con-textual information from the generated summary of the first incident;

to compute a set of one or more similarity scores for the first incident, wherein a given similarity score in the set is based at least in part on a comparison between the generated fixed-size embedding of the first incident and a fixed-size embedding generated by the at least one second machine learning model for one of a plurality of additional incidents in the at least one incident data-base;

to determine whether the first incident is a duplicate of at least one of the plurality of additional incidents based at least in part on the set of similarity scores; and to initiate an update to one or more data records in the at least one incident database associated with at least one of the first incident and the at least one of the plurality of additional incidents based at least in part on a result of the determining.

17. The apparatus of claim 16, wherein the at least one first machine learning model comprises a bidirectional auto-regressive transformer model.

18. The apparatus of claim 16, wherein the at least one second machine learning model comprises a robustly opti-mized bidirectional encoder representations from transform-ers approach model.

19. The apparatus of claim 16, wherein at least one of: the at least one first machine learning model and the at least one second machine learning model is pretrained on at least one generic textual dataset and is further trained using a dataset that is specific to the at least one incident database.

20. The apparatus of claim 19, wherein the dataset that is specific to the at least one incident database comprises a plurality of items, wherein each item comprises:

a first portion comprising text associated with a first historical incident of the at least one incident database;

a second portion comprising text associated with a second historical incident of the at least one incident database, wherein the second historical incident is a duplicate of the first historical incident; and a third portion comprising text associated with a third historical incident of the at least one incident database that is not a duplicate of the first historical incident.

* * * * *